Fig. 3A.

March 16, 1954     H. E. CRINER     2,671,968
DRIER SYSTEM Filed March 23, 1950     6 Sheets-Sheet 4

Fig.3B.

INVENTOR
Harry E. Criner
By his attorneys
Hoopes, Leonard & Glenn

March 16, 1954 H. E. CRINER 2,671,968
DRIER SYSTEM
Filed March 23, 1950 6 Sheets-Sheet 6

Fig. 5.

INVENTOR
Harry E. Criner
By his attorneys
Hoopes, Leonard & Glenn

Patented Mar. 16, 1954

2,671,968

UNITED STATES PATENT OFFICE 2,671,968

DRIER SYSTEM

Harry E. Criner, Pittsburgh, Pa., assignor to Heyl & Patterson, Inc., Pittsburgh, Pa., a corporation of Pennsylvania Application March 23, 1950, Serial No. 151,341

7 Claims. (Cl. 34—33)

1

This invention relates to means and method of drying a layer of material such as coal on a moving foraminous support.

It is conventional to pass hot air through a bed of coal particles on a travelling foraminous bed but heretofore the construction of such driers has been cumbersome and relatively inefficient. Either the flow of air through the bed has not been reversed in order to dry both the upper and lower layers of coal or else, when such reverse flow has been provided, the upward and downward passes of hot air have not been arranged with proper regard to the variations in temperature, moisture content and dust content of the upper and lower layers of coal at different stages of progress through the drier. Moreover, in conventional driers the newly heated air fed to the drier is either used in the drier without any admixture of lower temperature air in the drier in order to re-use the lower temperature air efficiently, or else all of the newly heated air is mixed with lower temperature used air before any of the newly heated air is introduced into the drier so that full advantage is not taken of the maximum temperature of the newly heated air for complete drying of the coal.

My drier is simple in construction and dries coal and other materials with rapidity and efficiency. I divide the incoming heated air into two streams, one of which passes preferably upwardly through a layer of coal or the like approaching the outlet of a drying chamber and the other of which mixes with the first stream emerging through the top of the layer. The mixture then passes in the opposite direction through the layer of coal or the like coming in through the inlet of the drying chamber. Dust rising from the dry outgoing layer is carried down by the mixed air and is trapped by the relatively moist incoming layer. The air emerging through the bottom of the incoming layer near the inlet is recirculated to a hot air supply chamber from which the original stream of hot air was drawn. The temperature of hot air for the drier is regulated by blowing off some of the used air and simultaneously drawing into the hot air supply chamber some of the air heated in an adjacent furnace. Automatic controls regulate the air temperature for the most efficient drying action and safety controls prevent further inflow of hot furnace air when necessary to protect the equipment. When my drier is used for coal or other solid fuels some of the heat and coal dust in the coal emerging from the drier chamber is recovered and usefully employed in the furnace firing chamber.

2

Further novel features and advantages of the drier system of my invention will become apparent from the following detailed description and in the accompanying drawings.

I have shown in the drawings for purposes of illustration, the following present preferred embodiment of my invention, in which.

Figure 3A:
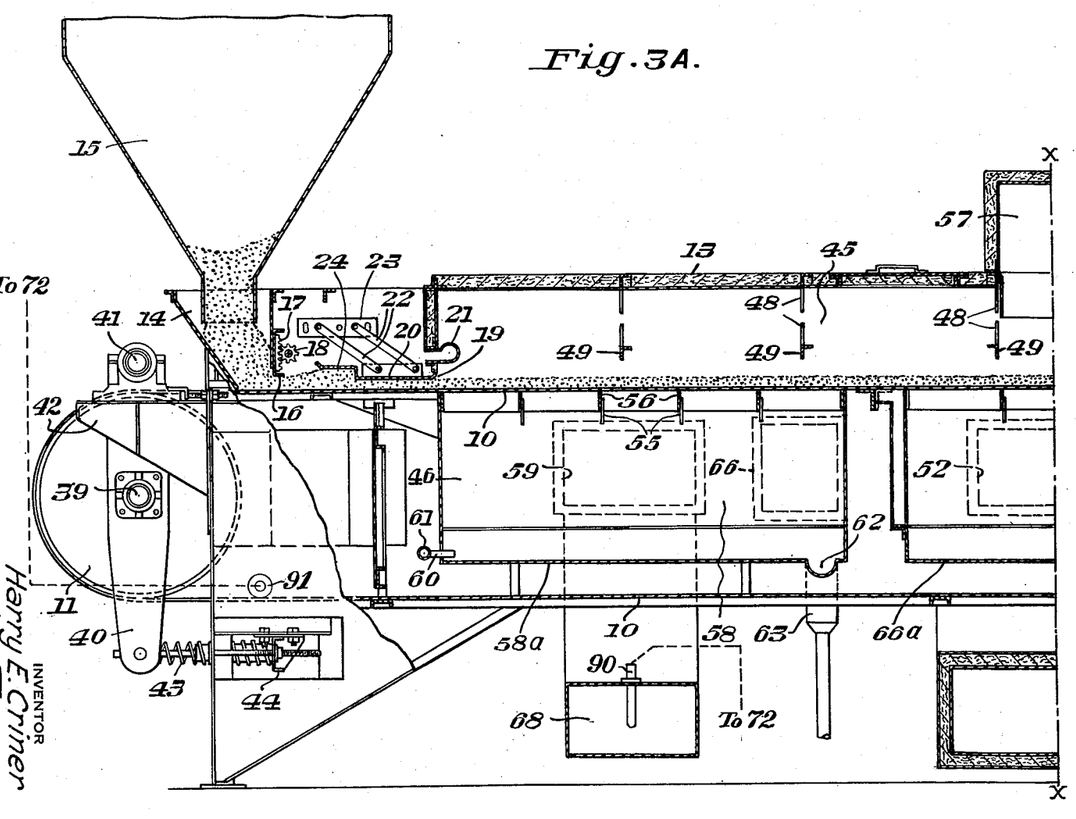
Figure 3A is an enlarged partial side view of the drier along its travelling belt, partially sectioned along the line III—III in Figure 2.

Referring now more particularly to the drawings and initially to Figures 3A and B in particular, there is provided a travelling foraminous link belt 10 supported between a pair of rollers 11 and 12 with the upper reach of the belt passing horizontally through a drying enclosure or chamber 13. As the upper reach of the belt leaves the rear roller 11 coal particles are deposited in a substantially even layer across the top of the belt from a feed hopper 14 fed from a surge bin 15. The hopper 14 extends transversely across the belt 10 and has a lip 16 which is vertically adjustable by a rack 17 driven by a pinion 18 on a shaft turned by a hand crank (not shown) in order to control both the thickness of the layer of coal on the belt 10 and the rate of feed from the bin 15. The layer of coal entering the drying chamber 13 through its inlet 19 passes under a floating shoe 20 extending transversely across the belt 10, and a flexible diaphragm 21 extends between the shoe 20 and the top of the inlet 19 to seal the space between the shoe and the top of the inlet. The movement of the shoe 20 is controlled by a pair of parallel arms 22 at each end of the shoe 20. The arms 22 are each pivotally connected at one end to the shoe 20 and at the other end to a plate 23 adjustably bolted to the drier frame. The arms 22 are of equal length and swing in parallel alignment so that the bottom flat surface of the shoe 20 remains horizontal as the shoe rises and falls on layers of coal of varying thickness on the belt 10. A flange 24 on the shoe 20 accumulates coal therebeneath to improve the air-seal between the shoe and the coal and to control the rise and fall of the shoe as the thickness of the coal on belt 10 varies. After passing through the drier chamber 13 the coal on the belt 10 emerges from an outlet 25 at the opposite end of the chamber 13 under a similar floating shoe 26 (Figure 3B) with a similar lifting flange 27, sealing diaphragm 28 and pivoted supporting arms 29. The coal on the belt 10 then passes over a heat recovery vacuum chamber 30 and over the roller 12 where it drops through a hopper 31 onto a travelling removal conveyor 32.

The roller 12 is keyed to a shaft 33 which is rotated by a motor 34 (Figure 2) through a belt 35 driven from the motor shaft, a speed reducer 36 driven by belt 35, a chain belt 37 driven by the speed reducer 36, and a sprocket 38 driven by the belt 37 and keyed to the shaft 33. The rear roller 11 idles on a shaft 39 journaled at either end in a pair of spaced arms 40 hung from a shaft 41 journaled at either end in bearings adjustably mounted on spaced brackets 42. Compression springs 43 connected between the free ends of the arms 40 and fixed supports 44 urge the roller 11 away from the roller 12 in order to hold the belt 10 in frictional engagement with the roller 12.

Figure 3B:
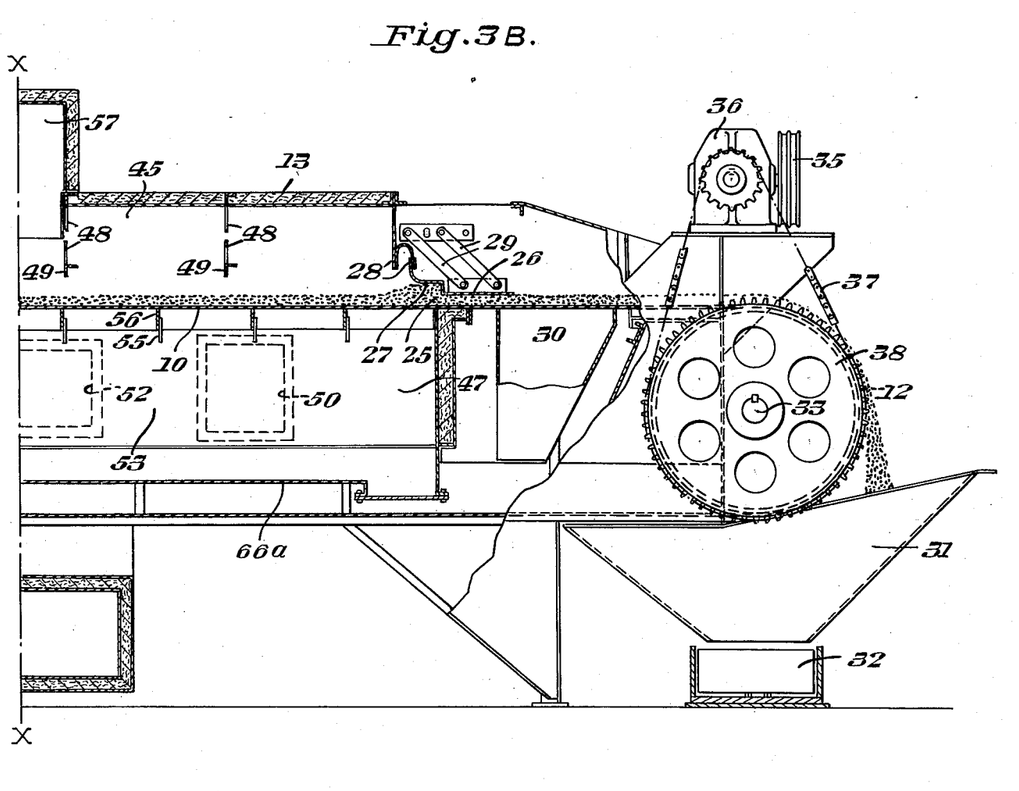
Figure 3B is a continuation of Figure 3A.
Figures 4, 6:
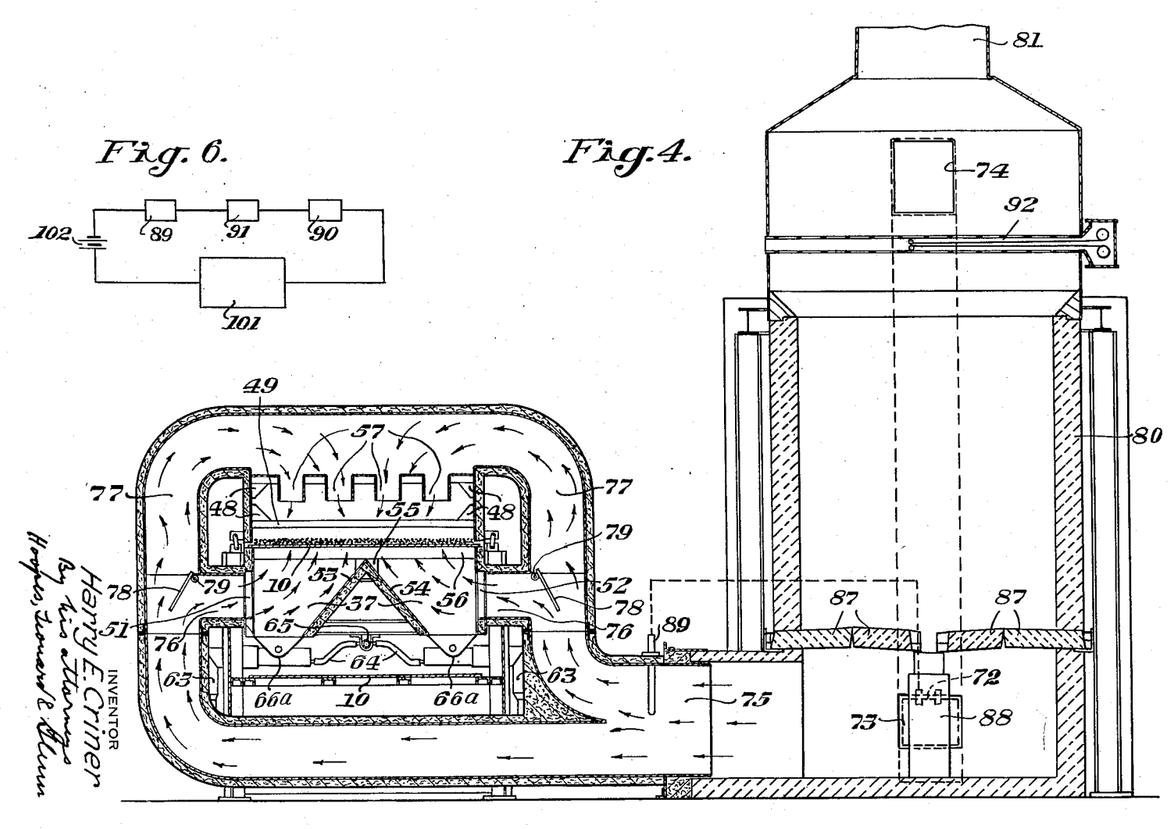
Figure 4 is an enlarged sectional view taken along the line IV—IV in Figure 2.
Figure 6 is a diagram illustrating one way in which the overriding control of one of the thermostats by another thereof may be accomplished.

Within the drying chamber 13 there is an upper enclosure 45 extending the length of the chamber above the belt 10 with a lower enclosure 46 beneath the belt adjacent the inlet 19 and a second lower enclosure 47 beneath the belt adjacent the outlet 25. Gussets 48 and crossmembers 49 strengthen the structure of the upper enclosure 45 without interfering with the flow of air therethrough. The second lower enclosure 47 has clean-out doors 50 on each side and receives heated air through a pair of opposite side openings 51 and 52 (Figures 3A, 3B and 4). This incoming air is deflected upwardly toward the moving belt 10 by a pair of oppositely slanting plates 53 and 54 which come together in an apex adjacent the undersurface of the belt 10 (Figure 4). Gussets 55 attach the plates 53 and 54 to each other and to cross-members 56 which support the belt 10 as it moves through the drying chamber 13. The air then passes upwardly through the belt 10 and the layer of coal thereon into the upper enclosure 45 where additional heated air is added through openings 57 in the top of the enclosure 45. The resultant mixture of air then passes laterally toward the portion of the belt adjacent the inlet 19 and then down through the incoming layer of coal and through the belt into the first lower enclosure 46. The used air in the enclosure 46 is deflected by oppositely slanting plates 58 like plates 53 and 54 in enclosure 47, and is exhausted through opposite side openings 59. The deflector plates 58 form troughs 58a with the sides of enclosure 46 and coal dust falling into these troughs is removed by a stream of water from nozzles 60, one in each trough, which are supplied by a pipe 61 (Figure 3A) and which deposit the dust in transverse conduits 62 flushed into carry-off pipes 63 by water from hoses 64 supplied by a pipe 65 (Figure 4). Clean-out doors 66 are also provided on each side of the enclosure 46. The bottom troughs 66a (Figure 4) in the enclosure 47 collect relatively little dust and are accessible for cleaning through the clean-out doors 50.

Figure 1:
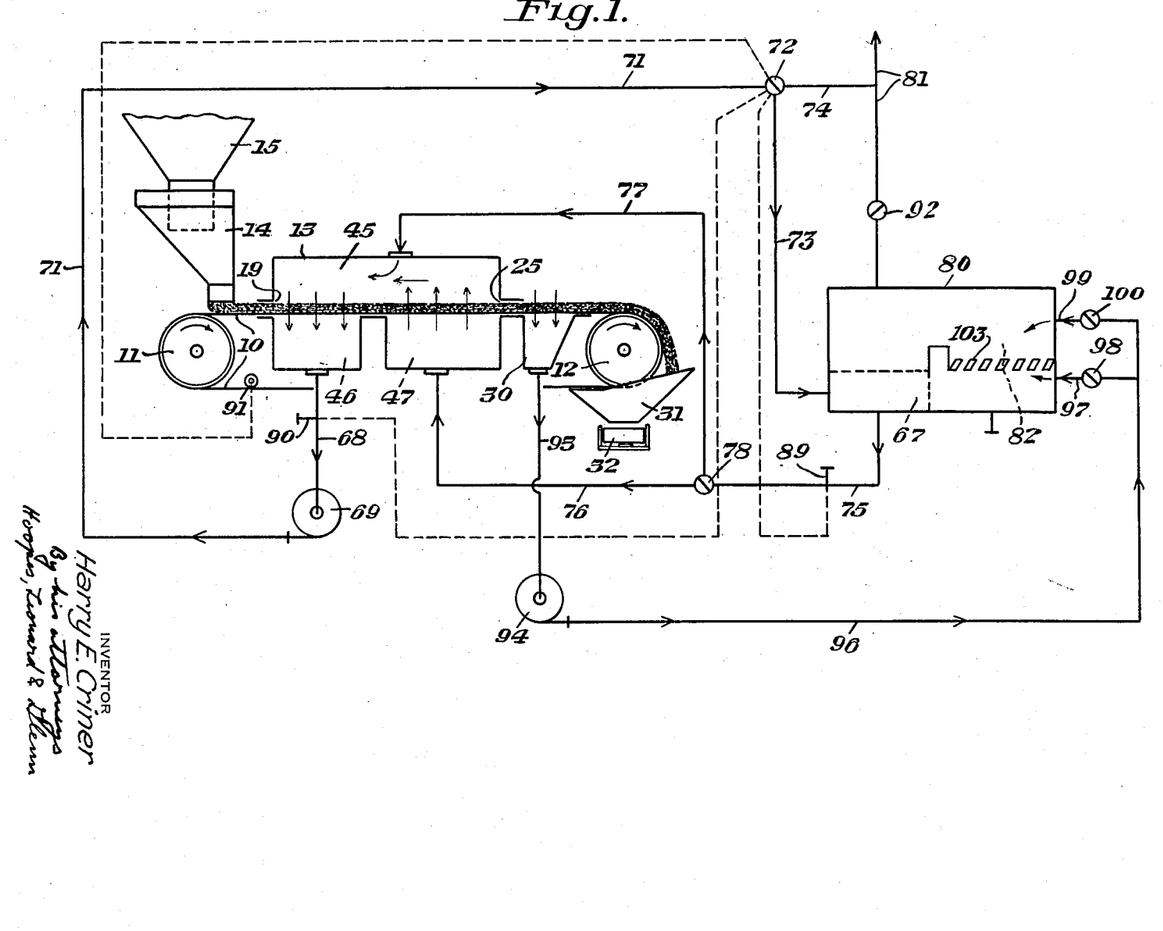
Figure 1 is a diagrammatic representation of a drier with air circulation and heating means for drying material on a travelling belt.
Figure 2:
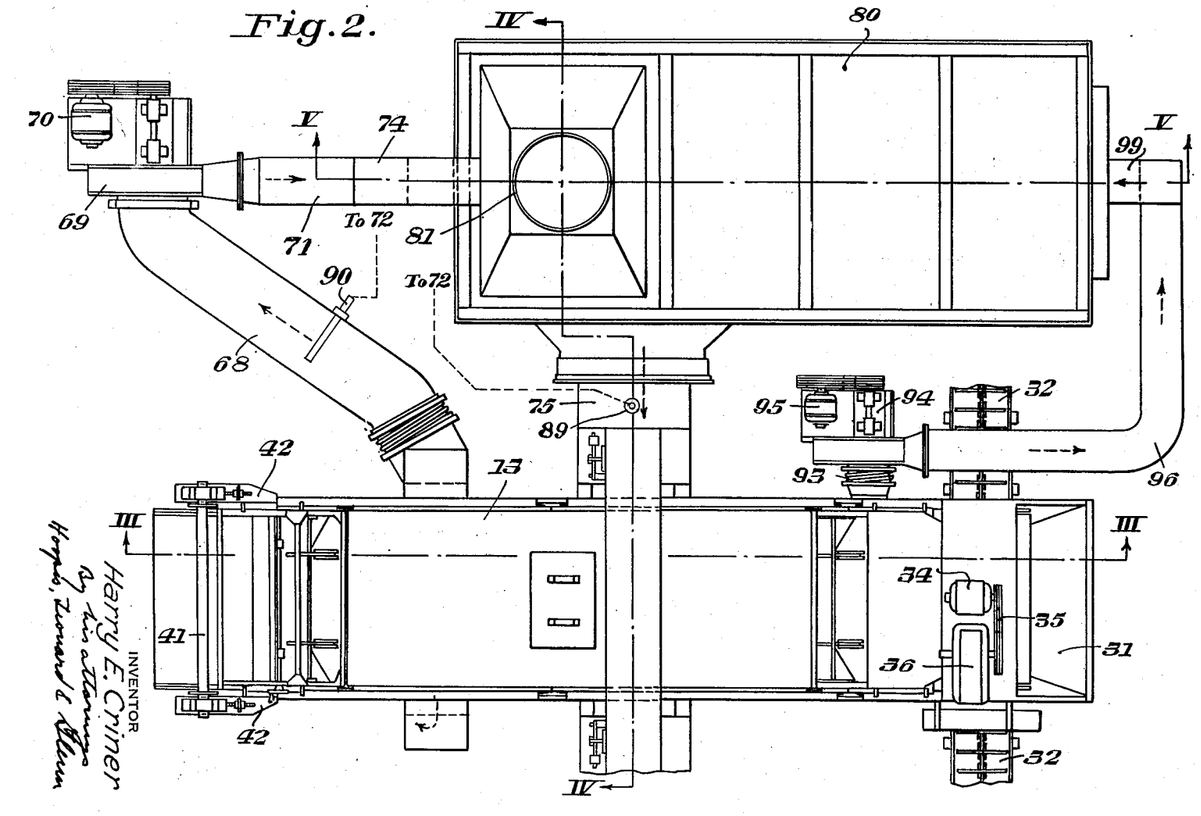
Figure 2 is a plan view elevation of the apparatus diagrammed in Figure 1.

The air fed to the drying chamber 13 is drawn from an air chamber 67 (Figure 5) and the air from the enclosure 46 which has been used in the drying chamber 13 is recirculated to the chamber 67. A duct 68 is connected to the exhaust openings 59 of the enclosure 46 and a blower 69 driven by a motor 70 exhausts air from the conduit 68 into a duct 71 (Figure 2). A damper 72 (Figures 1 and 5) selectively distributes air from the duct 71 between a branch conduit 73 opening into one end of the chamber 67 and a by-pass duct 74 for blowing off exhaust air. From a side opening in the chamber 67 a duct 75 conveys air to a pair of branch ducts 76 connected to the side openings 51 and 52 of the lower enclosure 47 and to a second pair of branch ducts 77 connected to the top openings 57 of the enclosure 45. Splitter dampers 78 are pivotally mounted on shafts 79 in the forks where the respective branch ducts 76 and 77 come together and are manually adjustable to control the distribution of hot air from the duct 75 between the upper enclosure 45 and the lower enclosure 46.

Figure 5:
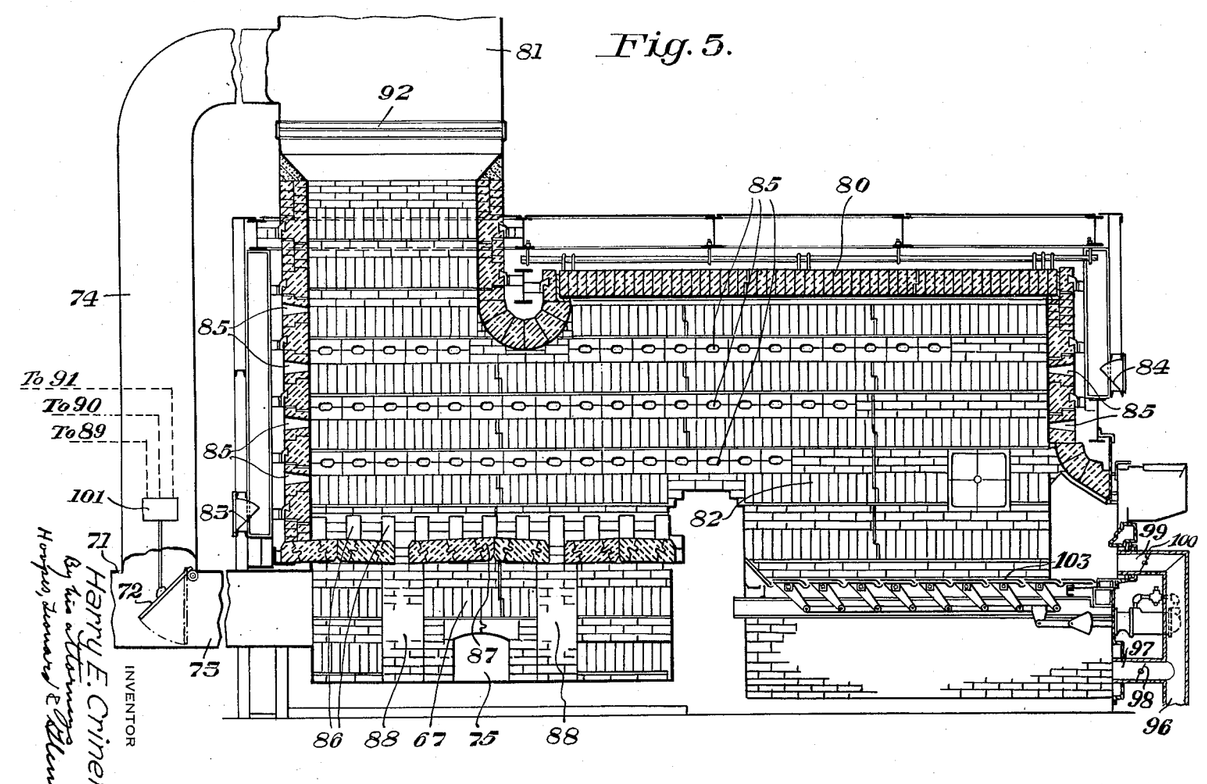
Figure 5 is a sectional view taken along the line V—V in Figure 2.

The top of the air chamber 67 receives hot air from a furnace 80. The furnace has its stack 81 above the air chamber and its firing chamber 82 spaced laterally on one side of the air chamber. The furnace illustrated in Figure 5 is coal fired by conventional means but other heating means and fuels may be substituted. Outside air is drawn through openings controlled by dampers 83 and 84 into channels in the refractory lining of the furnace and thence into the furnace interior through a plurality of openings 85 in the furnace side walls and end walls. The top of the air chamber 67 is covered by a grid formed by a series of parallel spaced refractory arches 86 overlying a transverse arch 87. The arches 86 and 87 are supported by the chamber walls and by a pair of pillars 88. The refractory roof arches 86 and 87 absorb some heat from the furnace and radiate it into the compartment 67 to heat the air therein, but most of the heated air for use in the drier is derived from the inflow of hot furnace air into the compartment 67. This inflow is controlled by the damper 72 because adjustment of the damper 72 to by-pass used air from the enclosure 46 up the stack 81 has the effect of causing hot furnace air to be sucked into the supply duct 75 to make up for the volume of the by-passed used air.

The operation of the damper 72 is regulated by controls of conventional design which are governed by a thermostat 89 (Figure 1) responsive to the temperature of air in the supply duct 75 leading to the drier 13, subject to the overriding control of a thermostat 90 responsive to the temperature of the air in the exhaust duct 68, and further subject to the overriding control of a roller switch 91 responsive to the speed of the belt 10. The thermostat 89 is set to adjust the damper 72 to divert air from the duct 71 to the by-pass duct 74 and thereby to draw more furnace air into the air chamber 67 and through the duct 75 into the drier 13 whenever the temperature in the duct 75 falls below a predetermined optimum temperature, such as 1000° F. The thermostat 90 is a safety thermostat arranged to adjust the damper 72 to divert all of the exhaust air through the duct 73 into the chamber 67 whenever the exhaust air from the enclosure 46 exceeds a predetermined safe maximum temperature, and the roller switch 91 has the same effect on the damper 72 when the speed of the belt 10 falls below a predetermined minimum safe limit. The overriding control of thermostat 89 by thermostat 90 and roller switch 91 is accomplished by having these controls connected in series with the damper operating mechanism 101 across a power source 102 (Figure 6). Thermostat 89 is intended to provide primary proportional heat input to the drier 13 for varying loads. Emergency conditions, however, such as excessive exhaust temperatures as reflected by thermostat 90 in duct 68 or stoppage or slipping of the conveyor belt as reflected by roller switch 91 open the series control circuit causing damper 72 to proceed to the safe operating position, thus effectively overriding thermostat 89. The furnace 60 is provided with conventional thermostatic controls for regulating the firing chamber 82 and a stack damper 92 in order to maintain a substantially constant predetermined furnace temperature such as 2000° F. above the chamber 67. These furnace controls are independent of the other thermostatic controls of the drier system except insofar as they operate to maintain the desired furnace temperature while fluctuating amounts of furnace air are drawn into the chamber 67.

The heat recovery vacuum chamber 30 recovers for use in the furnace 80 some of the heat value in the dried coal emerging from the drier 13 and also some of the loose coal dust particles which are undesirable in the dried coal but are usable as fuel in the furnace-firing chamber 82. A duct 93 connects the chamber 30 to an exhaust blower 94 driven by a motor 95 (Figure 2). The outlet of the blower 94 is connected through a duct 96 to the furnace-firing chamber 82. One branch 97 of the duct 96 is controlled by a damper 98 and under-fires the furnace (i. e., fires the furnace beneath the grate 103) and another branch 99 is controlled by a damper 100 and over-fires the furnace (i. e., fires the furnace above the grate 103).

The operation of the drying system is as follows:

Coal from the bin 15 is fed through the hopper 14 onto the belt 10 and is drawn into the drying chamber 13 under the floating shoe 20 which levels off the layer of coal so that it will be uniformly dried by heated air passing through it in the chamber 13. The incoming coal is partially dried by a downdraft of air passing from the upper enclosure 45 into the lower enclosure 46. This air consists of a mixture of air from the ducts 77 at a high temperature such as 1000° F. and used air at a lower temperature such as 250° F. which had previously passed into the enclosure 45 through the belt 10 from the ducts 76 and enclosure 47. The proportion of newly supplied and used air delivered by the ducts 77 on the one hand and the ducts 76 on the other hand is controlled by the dampers 78 so that the air mixed in the enclosure 45 is at an intermediate temperature such as 500° F. before it passes downwardly through the belt 10 into the enclosure 46. The initial downpass of air through the belt 10 has the effect of raising the temperature of the coal on the belt to evaporation temperature and of partially drying the coal, especially the top layers. The belt then passes over the enclosure 47 where an upcurrent of air at a high temperature such as 1000° F. passes through the belt and the partially dried layer of coal on the belt in order to complete the drying operation at the highest drier temperature and to apply the greatest heat to the bottom of the layer of coal where the first downdraft of mixed air has had the least effect. The temperature drop through the layer of coal during the initial drying operation is in the order of 750° F. and an upcurrent of the highest temperature air against the bottom of the layer of coal during the second stage is especially advantageous for the most efficient and uniform drying of coal in the drier. A further advantage of combining an initial downdraft with a final updraft is that the coal dust picked up by the updraft through the outgoing coal is carried back onto the relatively wet layer of incoming coal so that most of the dust is caught and is not circulated through the air regeneration system or through the by-pass duct 74 up the stack 81.

The heat lost by the hot air fed into the drier is reflected in a tendency of the temperature in the hot air supply duct 75 to drop. This actuates the thermostatic control 89 and causes it to operate the damper 72 to by-pass air from the duct 71 to the duct 74 in order to draw 2000° F. air from the furnace 80 into the chamber 67 and out through the supply duct 75 so that the desired minimum temperatures in the drier 13 are maintained for drying purposes. In the event that the temperatures in the drier 13 rise above a predetermined level for any reason, such as slippage of the belt 10 on the drive roller 12 so that the layer of coal does not move constantly out of the drier 13, the thermostatic control 90 or roller switch 91 is responsive and overrides the thermostatic control 89 to cause the damper 72 to divert all of the exhaust air through the chamber 67 and thence back to the drier 13 without the addition of any heated air of the furnace 80 until the drier temperatures fall to a safe limit. The advantage of connecting the safety controls to the damper 72 is that the damper 72 is immediately effective in preventing heated air from being drawn into the drier, with a minimum time-lag after the initial response of the safety controls 90 or 91. Connecting the safety controls to cut off power to the blower motor 70, for example, would be less effective because the rotary inertia of the blower 69 would cause it to continue to blow air from the chamber 67 into the drier 13 for several minutes and in the absence of the immediate action of the damper 72 enough hot air might be blown into the drier to ignite the layer of coal within the drier and thereby cause serious damage to the equipment.

The layer of coal emerging from the drier 13 is thoroughly dry and at the moisture evaporation temperature. Some of the heat and useful coal dust in this layer of dried coal is recovered and the coal is cooled by means of the heat recovery vacuum chamber 30 which draws cool air through the dried coal bed and passes this air at a temperature in the order of 100° F. to the furnace-firing chamber 82 where the heat in this relatively low temperature air can be utilized most efficiently and where the coal dust from the dried coal can be burned to help maintain the drying operation.

While I have shown and described certain present preferred embodiments of the invention and have disclosed certain present preferred methods of practicing the same, it is to be distinctly understood that the invention is not limited thereto but may otherwise variously be embodied and practiced within the scope of the following claims.

I claim:

1. Apparatus for drying coal or the like comprising a drier enclosure having a heated air inlet and a used air outlet, a foraminous conveyor for conveying a continuous stream of coal or the like through the enclosure, a furnace, an air supply chamber opening into the furnace, a supply duct connecting the air supply chamber with the drier enclosure inlet, a return duct connecting the air supply chamber with the drier chamber outlet, a blower for moving air through the supply duct to the drier enclosure for drying the stream of coal and the like and for returning the used air through the return duct to the air chamber, adjustable means in the return duct for variably discharging said used air and thereby causing air to pass from the furnace into the air supply chamber and thence into the drier enclosure, means responsive to supply duct air temperatures connected to regulate said adjustable means, and means responsive to return duct air temperatures connected to override the control of said means responsive to supply duct air temperatures and to regulate the adjustable means so that all of the used air is returned to the air supply chamber when the return supply duct air temperatures exceed a predetermined maximum safe limit.

2. Apparatus for drying coal or the like comprising a drier enclosure having a heated air inlet and a used air outlet, a foraminous conveyor and means to move it for conveying a continuous stream of coal or the like through the enclosure, a furnace, an air supply chamber opening into the furnace, a supply duct connecting the air supply chamber with the drier chamber inlet, a return duct connecting the air supply chamber with the drier enclosure outlet, a blower for moving air through the supply duct to the drier enclosure for drying the stream of coal and the like and for returning the used air through the return duct to the air chamber, adjustable means in the return duct for variably discharging said used air and thereby causing air to pass from the furnace into the air supply chamber and thence into the drier enclosure, means responsive to supply duct air temperatures connected to regulate said adjustable means, and means responsive to reduced rate of movement of said conveyor connected to override the control of said means responsive to supply duct air temperatures whenever the conveyor slows below a predetermined minimum rate of movement, and thereupon to regulate the adjustable means so that all of the used air is returned to the air supply chamber.

3. Apparatus for drying coal or the like comprising a foraminous belt, means supporting the belt for movement of a portion of the belt along a generally horizontal path, driving means connected to move the belt along said path, a stationary enclosure for a portion of the belt moving along said path, said enclosure comprising at least a pair of lower chambers disposed along the length of the belt in communication with the lower face of the belt and an oppositely disposed upper chamber disposed in communication through the belt with both of the lower chambers, air heater means connected to supply heated air to the one of the lower chambers and also to the upper chamber, said lower chamber having a pair of baffle elements coming together closely beneath the center of the belt along its line of movement and sloping away from each other below the belt, a pair of ducts to receive heated air from the heater means and to direct the air in divided streams in opposite directions transversely of the belt against said baffle elements, and an air outlet from the other of the lower chambers, said driving means being arranged to move the belt in the direction in which it passes over the lower chamber with the air outlet before it passes over the lower chamber connected to the air heater and blower means, and means to increase the pressure of air supplied by the heater over the pressure of air at the air outlet, whereby heated air entering one of the pair of chambers from the air heater and blower means is directed by said baffles upwardly through the belt and the layer of coal or the like thereon and there is mixed with additional heated air furnished to the upper heated chamber, and the mixture then passes down through the belt and the layer of coal or the like thereon and into the chamber having an air outlet.

4. Apparatus for drying coal or the like comprising a foraminous belt for moving a layer of coal or the like along a generally horizontal path, driving means connected to move the belt in a given direction along said path, a stationary drier enclosure for the belt and layer moving along a portion of said path, said enclosure having a close-fitting entrance and exit for the belt and layer, and being arranged to dry a wet layer of coal or the like with a single upwardly directed stream of air through the belt and layer adjacent the enclosure exit and a single downwardly directed stream of air through the layer and belt adjacent the enclosure entrance, said enclosure comprising a chamber disposed above the belt and two chambers disposed in tandem below the belt beneath the upper chamber, one of said lower chambers having an air outlet and being disposed adjacent the conveyor entrance and the other lower chamber being disposed adjacent the conveyor exit, hot air supply means connected to the upper chamber and also to the lower chamber adjacent the conveyor exit, means to control the proportion of hot air supplied to the respective connected chambers, and blower means connected to cause hot air to pass from the lower chamber adjacent the enclosure exit up through the belt and layer into the upper chamber, where the balance of heated air is added, and to cause the resultant mixture of air to pass down through the layer and belt into the lower chamber adjacent the conveyor entrance and out through said air outlet.

5. A method of drying a layer of coal or the like comprising the steps of depositing the layer on a foraminous belt and moving the layer and supporting portion of the belt along a generally horizontal path, heating air and using it to dry successive portions of the layer in only two passes therethrough by passing part of the heated air in an updraft through the belt and layer at a fixed position along said path, then adding this used air to the balance of the heated air and passing the mixture in a downdraft through the layer and belt at another fixed position preceding the first position along the line of movement of the layer.

6. Apparatus for drying coal or the like comprising a foraminous conveyor for moving a layer of coal or the like along a generally horizontal path, driving means connected to move the layer along said path in a given direction, a stationary enclosure for a portion of the layer moving along said path, said enclosure comprising at least a pair of chambers disposed in communication with opposite upper and lower faces of the conveyor, the lower chamber being disposed immediately adjacent where the layer enters the drier enclosure and extending substantially less than the whole length of the path within the enclosure, means to supply and direct hot air through the conveyor and layer along at least a portion of the balance of the length of the path within the enclosure, means to supply hot air to said upper chamber, including means to direct into said upper chamber substantially all of the hot air initially supplied to other portions of the drier enclosure, an air outlet in the lower chamber, and an air blower connected to force air from the upper chamber through the layer and conveyor into the lower chamber and thence through said air outlet, whereby drops of water on the coal tend to be blown downwardly through the conveyor, and the relatively wet entering layer of coal serves as a filter to prevent dry particles of coal from escaping from the drier enclosure.

7. Apparatus for drying coal or the like comprising a foraminous conveyor for moving a layer of coal or the like along a generally horizontal path, driving means connected to move the layer along said path in a given direction, a stationary enclosure for a portion of the layer moving along said path, said enclosure comprising at least a pair of chambers disposed in communication with opposite upper and lower faces of the conveyor, the lower chamber being disposed immediately adjacent where the layer enters the drier enclosure and extending substantially less than the whole length of the path within the enclosure, means to supply and direct hot air up through the conveyor and layer along at least a portion of the balance of the length of the path within the enclosure, means to supply hot air to said upper chamber, including means to direct into said upper chamber substantially all of the hot air initially supplied to other portions of the drier enclosure, an air outlet in the lower chamber, and an air blower connected to force air from the upper chamber through the layer and conveyor into the lower chamber and thence through said air outlet, whereby drops of water on the coal tend to be blown downwardly through the conveyor, and the relatively wet entering layer of coal serves as a filter to prevent dry particles of coal from escaping from the drier enclosure.

HARRY E. CRINER.

References Cited in the file of this patent

UNITED STATES PATENTS

| Number | Name | Date |
|---|---|---|
| 30,512 | Wheeler | Oct. 23, 1860 |
| 1,201,131 | Althouse | Oct. 10, 1916 |
| 1,332,657 | Andrews | Mar. 2, 1920 |
| 1,352,377 | Plummer | Sept. 7, 1920 |
| 1,424,565 | Goskar | Aug. 1, 1922 |
| 1,669,012 | Nordstrom | May 8, 1928 |
| 1,761,016 | Koehring et al. | June 3, 1930 |
| 1,919,057 | Furbush | July 18, 1933 |
| 1,941,560 | Lee | Jan. 2, 1934 |
| 2,014,941 | Lee | Sept. 17, 1935 |
| 2,125,382 | Lykken et al. | Aug. 2, 1938 |
| 2,132,656 | Smith | Oct. 11, 1938 |
| 2,174,066 | Ahlmann | Sept. 26, 1939 |
| 2,242,918 | Muth et al. | May 20, 1941 |
| 2,502,134 | Erickson | Mar. 28, 1950 |

FOREIGN PATENTS

| Number | Country | Date |
|---|---|---|
| 25,388 | Great Britain | Dec. 6, 1906 |

OTHER REFERENCES

The D-L-O Dryer, Bulletin 501, Oliver United Filters, pages 4 and 5 (by count) relied on.